United States Patent [19]

Yagyu et al.

[11] Patent Number: 4,770,937

[45] Date of Patent: Sep. 13, 1988

[54] FLUORINE-CONTAINING ELASTOMERIC ELECTRIC INSULATING MATERIAL AND INSULATED ELECTRIC WIRE COATED THEREWITH

[75] Inventors: Hideki Yagyu; Ikuo Seki, both of Ibaraki; Mituharu Morozumi; Yasumichi Ito, both of Kanagawa; Rikichi Koike, Ibaraki, all of Japan

[73] Assignees: Hitachi Cable, Ltd.; Asahi Glass Co., Ltd., both of Tokyo, Japan

[21] Appl. No.: 62,400

[22] Filed: Jun. 15, 1987

Related U.S. Application Data

[63] Continuation of Ser. No. 776,295, Sep. 16, 1985, abandoned, which is a continuation of Ser. No. 392,910, Jun. 28, 1982, abandoned.

[30] Foreign Application Priority Data

| Jun. 26, 1981 | [JP] | Japan | 56-100052 |
| Jun. 26, 1981 | [JP] | Japan | 56-100053 |
| Jun. 29, 1981 | [JP] | Japan | 56-101953 |
| Jun. 30, 1981 | [JP] | Japan | 56-101709 |
| Sep. 30, 1981 | [JP] | Japan | 56-155775 |

[51] Int. Cl.$^4$ .............. B32B 9/00; B32B 27/00; H01B 7/00
[52] U.S. Cl. .............. 428/383; 174/110 FC; 174/120 SR; 428/372; 428/384; 428/389; 428/390; 428/365
[58] Field of Search .............. 428/372, 375, 379, 383, 428/365, 389, 390, 384; 174/110 FC, 120 SR; 526/255, 210; 525/377, 386, 377; 528/481

[56] References Cited

U.S. PATENT DOCUMENTS

| 3,467,635 | 9/1969 | Brasen et al. | 528/481 |
| 3,825,510 | 7/1974 | Yamamoto et al. | |
| 3,911,192 | 10/1975 | Aronoff et al. | 427/120 X |
| 3,970,770 | 7/1976 | Dhami | 428/379 |
| 3,995,091 | 11/1976 | Dhami | 428/379 |
| 4,041,237 | 8/1977 | Stine et al. | 174/36 |
| 4,079,191 | 3/1978 | Robertson et al. | 174/121 SR |
| 4,463,144 | 7/1984 | Kojima et al. | 526/255 |

*Primary Examiner*—Lorraine T. Kendell
*Attorney, Agent, or Firm*—Sughrue, Mion, Zinn, Macpeak, and Seas

[57] ABSTRACT

A fluorine-containing elastomeric electric insulating material is disclosed. The material is a vulcanized product of a composition comprising 100 parts by weight of a fluorine-containing elastomeric copolymer having a number average molecular weight of from 20,000 to 60,000, containing as major components a unit based on tetrafluoroethylene and a unit based on an α-olefin having 2 to 4 carbon atoms and exhibiting rubber elasticity at room temperature, 0.1 to 5 parts by weight of an organic peroxide and 0.1 to 20 parts by weight of a polyallyl compound.

12 Claims, No Drawings

FLUORINE-CONTAINING ELASTOMERIC ELECTRIC INSULATING MATERIAL AND INSULATED ELECTRIC WIRE COATED THEREWITH

This is a continuation of application Ser. No. 776,295, filed Sept. 16, 1985, and now abandoned, which is a continuation of application Ser. No. 392,910, filed June 28, 1982, and now abandoned.

FIELD OF THE INVENTION

The present invention relates to an electric insulating material comprising a vulcanized composition containing a fluorine-containing elastomeric copolymer as the major component and an insulated electric wire having a coating of the electric insulating material.

BACKGROUND OF THE INVENTION

Fluorine-containing elastomeric copolymers have high resistances to heat, oils and chemicals and have been employed for various uses, for example, gaskets, packings, diaphragms, hoses, etc. Due to such excellent properties, the copolymers also have great potential for use as electric insulating materials such as electric wire coating materials.

However, conventional fluorine-containing elastomeric copolymers have poor electric insulating characteristics or moldability and even the copolymers having good moldability are not satisfactory in mechanical strength or dielectric breakdown strength after thermal ageing. Thus, the fluorine-containing elastomeric copolymer compositions are not practically used sufficiently as electric insulating materials.

SUMMARY OF THE INVENTION

Therefore, one object of the present invention is to provide a heat-resistant electric insulating material having good electrical insulating characteristics, moldability and mechanical strength.

Another object of the present invention is to provide a heat-resistant electric insulating material having excellent dielectric breakdown strength after thermal aging in addition to the above mentioned three characteristics.

A further object of the present invention is to provide a heat-resistant insulated electric wire having an insulating coating with smooth surface and good mechanical strength.

Still another object of the present invention is to provide a heat-resistant insulated electric wire having an insulating coating having excellent dielectric breakdown strength after thermal aging.

As a result of various studies to meet the above requirements, it has been found that a composition comprising 100 parts by weight of a fluorine-containing elastomeric copolymer having a number average molecular weight of from 20,000 to 60,000, containing as major components a unit based on tetrafluoroethylene and a unit based on an α-olefin having 2 to 4 carbon atoms and exhibiting rubber elasticity at room temperature, 0.1 to 5 parts by weight of an organic peroxide and 0.1 to 20 parts by weight of a polyallyl compound has a good extrusion moldability and can be extruded with a thin thickness. It has been also found that a vulcanized product of such composition has good electrical and mechanical characteristics desirable for use as an electric insulating material.

Further, it has been found that a composition prepared by further blending 0.1 to 15 parts by weight of at least one metal oxide selected from magnesium oxide, calcium oxide and lead oxide and 1 to 100 parts by weight of a silicic compound with the composition has good extrusion moldability and can be extruded with a thin thickness and a vulcanized product of such composition has good electrical characteristics (particularly, high dielectric breakdown strength after thermal aging) and mechanical characteristics which are desirable for use as electric insulating materials.

DETAILED DESCRIPTION OF THE INVENTION

It is important in the present invention that the fluorine-containing elastomeric copolymer which can be used has a number average molecular weight of from 20,000 to 60,000, preferably from 30,000 to 50,000. If the number average molecular weight exceeds 60,000, cracks cause on the molded product during thin thickness extrusion and on the other hand, if the number average molecular weight is less than 20,000, a cross-linked product having desired mechanical strength cannot be obtained.

There is no particular limitation in a method for producing the fluorine-containing elastomeric copolymer having the above-described number average molecular weight range. A method can be employed, wherein the molecular weight of the polymer produced is directly controlled by varying the copolymerization reaction conditions such as the concentration of each monomer, the concentration of a polymerization initiator, the ratio of each monomer to the polymerization initiator, the polymerization temperature and use of a chain transfer agent. Another method can be employed, wherein a high-molecular copolymer is first produced by copolymerization reaction and then its molecular weight is reduced to the desired level by heating the copolymer in the presence of oxygen.

The number average molecular weight of the fluorine-containing elastomeric copolymer can be measured by the osmometry, but for relative comparison between copolymers of the same structure, the number average molecular weight can be calculated from the measurement values of their inherent viscosity. For instance, the number average molecular weight ($\overline{Mn}$) of tetrafluoroethylene-propylene copolymers (containing 54 to 57 mol% of a unit based on tetrafluoroethylene) which are preferably used in the present invention can be calculated from the inherent viscosity $[\eta]$ (dl/g) as measured in tetrahydrofuran at 30° C. by the following formula:

$$\overline{Mn} = [\eta]^{1.8} \times 2.0 \times 10^5$$

It is also important in the present invention that the fluorine-containing elastomeric copolymer contains as major components a unit based on tetrafluoroethylene and a unit based on an α-olefin having 2 to 4 carbon atoms: A fluorine-containing elastomeric copolymer which contains as a major component a unit based on vinylidene fluoride is not effective since it does not have the dielectric characteristics or electric insulating properties desirable for insulating materials.

Examples of α-olefin having 2 to 4 carbon atoms which are copolymerized with tetrafluoroethylene to provide an elastomeric copolymer include propylene, butene-1 or a combination of two or more monomers selected from ethylene, propylene, butene-1 and isobutene. Propylene is particularly preferred to achieve the object of the present invention.

Suitable examples of the tetrafluoroethylene-propylene copolymers include copolymers comprising not only the major components of tetrafluoroethylene and propylene but also suitable amounts of other comonomers copolymerizable therewith, such as ethylene, butene-1, isobutene, acrylic acid or its alkyl esters, methacrylic acid or its alkyl esters, vinyl fluoride, vinylidene fluoride, hexafluoropropene, chloroethylvinyl ether, glycidylvinyl ether, chlorotrifluoroethylene and perfluoroalkylvinyl ether. From the viewpoints of high heat resistance and good moldability, the molar ratio of tetrafluoroethylene to propylene is generally from 95:5 to 30:70, preferably from 90:10 to 45:55. The other optional components described above are generally used in an amount of not more than 50 mol %, preferably not more than 30 mol %.

It is also important in the present invention that a composition comprising the above-described fluorine-containing elastomeric copolymer as the major component and specified amounts of an organic peroxide and a polyallyl compound be vulcanized.

The organic peroxide used in the present invention serves as a cross-linking agent. Specific examples thereof include monoperoxide compounds such as diacyl peroxide (e.g., dibenzoyl peroxide), dicumyl peroxide, di-t-butyl peroxide, and peroxyesters (e.g., t-butyl peroxyacetate, t-butyl peroxyisopropyl carbonate and t-butyl peroxybenzoate), and diperoxy compounds such as 2,5-dimethyl-2,5-di-(t-butylperoxy)hexyne-3, 2,5-dimethyl-2,5-di-(t-butylperoxy)hexane, 1,4-bis(t-butyl-peroxy-isopropyl)benzene, 1,3-bis(t-butylperoxy-isopropyl)benzene, and 2,5-dimethyl-2,5-di(benzoylperoxy)hexane. These peroxides can be used alone or in mixtures thereof.

The organic peroxides are used in an amount of from about 0.1 to 5 parts by weight, preferably from about 0.5 to 3 parts by weight, per 100 parts by weight of the fluorine-containing elastomeric copolymer.

The polyallyl compound acts as a cross-linking aid, and specific examples thereof include diallyl phthalate, triallyl phosphate, triallyl cyanurate, triallyl isocyanurate and diallyltriamine. The polyallyl compounds are used in an amount of from about 0.1 to 20 parts by weight, preferably from 0.2 to 10 parts by weight, per 100 parts by weight of the fluorine-containing elastomeric copolymer.

Peroxide vulcanization in the presence of the organic peroxide and polyallyl compound makes it possible to suppress any residual ionic impurities in the cross-linked product, resulting in lowering electrical characteristics of the product.

The composition comprising the fluorine-containing elastomeric copolymer, organic peroxide and polyallyl compound may contain various additives such as fillers, reinforcing agents, pigments, lubricants, extrusion aids, antioxidants, stabilizers, etc. The composition of the present invention desirably has a Mooney viscosity $ML_{1+4}$ (100° C.) of from about 20 to 150, preferably from about 30 to 90 to provide good moldability, a smooth coating and good insulating characteristics, and it is desired that blending of the components is controlled as to provide the above-described Mooney viscosity range. It is also desired that each component is uniformly dispersed in the composition. The uniform dispersion can be attained by kneading the composition using a conventional rubber kneading roll or a Banbury mixer at a temperature of about 30°–80° C. for about 10 to 60 minutes.

The composition of the present invention enables a thin thickness molding (about 0.1–2 mm thickness) which has not been employed in the conventional compositions because it impairs the surface of the molded article. There is no particular limitation in the conditions for extrusion molding, and an extrusion temperature of from 50° to 150° C., preferably from 70° to 130° C. is employed.

In the present invention, optimum conditions for cross-linking the fluorine-containing elastomeric copolymer under heating are selected depending upon the type and proportions of the starting components. The cross-linking temperature is generally from about 80° to 25° C., preferably from about 130° to 210° C., and the cross-linking period is generally from about 0.5 to 200 minutes, preferably from about 1 to 100 minutes. The heating period can be shortened by increasing the heating temperature. The cross-linked composition may be subjected to addition heat treatment at about 150°–250° C. for about 2 to 25 hours to improve its physical characteristics.

According to the present invention, the composition comprising the fluorine-containing elastomeric copolymer, organic peroxide and polyallyl compound may further contain a specified amount of at least one metal oxide selected from magnesium oxide, calcium oxide and lead oxide and a specified amount of a silicic filler, and an electric insulating material is prepared by vulcanizing the resulting composition.

The Metal oxide can be used alone or mixtures thereof in an amount of from 0.1 to 15 parts by weight, and the amount can appropriately adjust mechanical characteristics of the vulcanized product such as elongation at break or resistance to thermal aging.

The silicic compound is used in an amount of from 1 to 100 parts by weight from the viewpoint of the dielectric breakdown strength after thermal aging.

If the silicic compound is replaced by other fillers such as carbon black, α-alumina, calcium fluoride, magnesium fluoride, sodium fluoride and calcium carbonate, improved dielectric breakdown strength after thermal aging cannot be achieved. Using too much silicic compound should be avoided since it lowers resistance to thermal aging and flexibility of the cross-linked product. Typical examples of the silicic compound include hydrous magnesium silicate (talc), hydrous aluminum silicate (clay), silicic anhydride (aerosil), silica, etc.

The composition comprising the fluorine-containing elastomeric copolymer, organic peroxide, polyallyl compound, metal oxide and silicic filler may also contain various additives such as reinforcing agents, other fillers, pigments lubricants, antioxidants, stabilizers, etc. The resulting composition preferably has a Mooney viscosity $ML_{1+4}$ (100° C.) of from about 20 to 150, particularly from about 30 to 90 to provide good moldability and smooth surface molded article. The molded article is then subjected to cross-linking under heating.

The electrical insulating material of the present invention can be formed into various shapes such as sheets, coated electric wires, pipes, rods, tubes, angles, channels, coated fabrics and coated plates by various methods such as transfer molding, roll coating, brushing, impregnation, etc., in addition to the conventional molding using metallic mold, and then vulcanized by a suitable method. In particular, even if an extrusion moldable composition having a low Mooney viscosity is prepared using a fluorine-containing elastomeric copolymer having a relatively low molecular weight in a degree of a number average molecular weight of about 60,000 or less, high mechanical strength of the vulcanized product can be maintained by the use of specified metal oxide, and thus the extrusion molded product can be vulcanized to obtain a vulcanized product having excellent characteristics.

The electrical insulating material of the present invention has high resistance to heat, oils and chemicals and at the same time, has high dielectric breakdown strength after thermal aging, so that it is very useful as a material for insulating spacers in electric apparatuses, insulating tapes to be wrapped around joints or terminals of electric cables, heat-shrinkable tubes and the like. The material is particularly effective as an insulation coating for insulated electric wires.

The insulated electric wires coated with the insulating material of the present invention is applicable as heat-resistant wires to all types of electrical and electronic apparatuses for use in high temperature atmospheres, and those are particularly suitable for use as leads from motors or wires around electric furnaces.

The conductor to be covered with a coating of the insulating material of the present invention may be a single metal wire, but to provide flexibility, a stranded conductor composed of a plurality of twisted thin metal wires is preferred. If a stranded conductor is used, an intermediate layer must be provided between the stranded conductor and the insulation coating to prevent the insulating material from sinking in the spaces between the thin metal wires during extrusion-molding and thermally cross-linking the insulation coating.

Suitable examples of the intermediate layer include (a) a material which does not break and can maintain a solid state in a winding test of the insulated wire under heating at 150° C. or more, (b) a material that the surface contacting the insulation coating is non-sticky, and (c) a material that the surface contacting the insulation coating is easily disintegrable.

The intermediate layer (a) can be made of various materials depending on the purpose of use of the insulated wire. When wires are used under relatively mild conditions, polyesters such as polyethylene terephthalate, polyamides such as Nylon 12, polymethylpentene-2 or polysulfone are used. When wires are used under thermally severer conditions, aromatic polyamides, polyamideimides, polyphenylene oxides, polyphenylene sulfides, polyparabanic acids or polymides are used. The intermediate layer made of these materials can be used in the form of not only a film but also a nonwoven fabric. The winding test under heating is conducted to evaluate the practicability of a fluorine-containing elastomer coated wire as a heat resistant flexible wire. In this test, an insulated sample wire wound around a metal rod having the same diameter as that of the wire is exposed to a given temperature not lower than 150° C. for a predetermined period, and the surface of the insulation coating is visually checked whether any cracks or crazes caused. The heating temperature and period are selected from the range of about 150° to 300° C. and several hours to several tens of days depending on the purpose of use of the wire. If desired, the wire may be heated at the temperature within the above-described range for the period within the above-described range prior to winding it around a metal rod having the same diameter as that of the wire.

The intermediate layer (b) may be made of a wide variety of materials having a non-sticky surface, for example, fibrous materials such as paper which are treated with various releasing agents, films made of materials such as fluorine resins which are non-sticky per se, films coated with non-sticky materials, resin films made of resins and incorporated therein non-sticky components such as low-molecular weight polytetrafluoroethylene or metal soap, as well as various laminates having a surface layer made of these materials. In consideration of handling during the formation of the intermediate layer, availability, and stability of the resulting heat-resistant insulated wire, fibrous materials treated with a releasing agent and fluorine resin films are preferred.

Preferred releasing agents are heat-stable silicone and fluorine compounds. Suitable silicone releasing agents include solution or emulsion type reactive silicones generally used in release paper, and emulsion, solution or aerosol type non-reactive silicones used in metallic mold releasing agents. Suitable fluorine releasing agents include dispersion or solution type perfluoroalkyl group-containing polyacrylates generally used to provide water or oil repellency, perfluoroalkyl group-containing phosphate esters used for paper finishing, as well as low molecular weight polytetrafluoroethylenes, tetrafluoroethylene telomers and chlorotrifluoroethylene telomers.

Suitable fluorine resins for the starting materials of fluorine resin films as an intermediate layer in the present invention include perfluoropolymers such as polytetrafluoroethylene, tetrafluoroethylene-hexafluoropropene copolymers, tetrafluoroethylene-perfluorovinyl ether copolymers and tetrafluoroethylene-hexafluoropropeneperfluorovinyl ether copolymers, as well as polychlorotrifluoroethylene wherein some of the fluorine atoms bonded to the main chain are replaced by chlorine or hydrogen atoms, ethylene-tetrafluoroethylene copolymers, ethylene-chlorotrifluoroethylene copolymers, polyvinylidene fluoride and polyvinyl fluoride, and those wherein the above-described polymers are modified with a small amount of comonomers.

The term "easily disintegrable" as used to describe the intermediate layer (c) means the property of a material which disintegrates easily under flexural stress and wherein the effect of disintegration affect the entire part under stress and leaves no local great crack. The following methods can be used to made at least the surface of the intermediate layer easily disintegrable: (1) a method for rendering a material easily disintegrable by wrapping a material such as paper which is easily brittle under heating around the conductor and further covering it with a composition mainly composed of a fluorine-containing elastomer and heat treating the resulting product under conditions that embrittles the material but do not cause significant deterioration of the rubber insulation layer; (2) a method for rendering a surface layer easily disintegrable by using a laminate comprising a heat-resistant substrate such as a heat-resistant resin film and coated therewith a surface layer of a material which becomes brittle with heat as a material for intermediate layer and treating as in (1) above; (3) a method for rendering a coating layer easily disintegrable by forming a coating made of a particulate, powdery or hollow particulate inorganic material containing as a binder a material which easily evaporates, decomposes or embrittles by heating on the conductor and heating the coating to remove or embrittle the binder to thereby make the coating easily disintegrable; and (4) a method for rendering the surface layer easily disintegrable by coating a resin film on the conductor, forming a coating thereon as in (3) above and treating as in (3) to make the surface coating easily disintegrable.

The method (1) is preferred and practically employed from the standpoint of operation.

In the method (3) or (4), a coating of fluorine-containing elastomeric composition can be formed on the conductor before, during or after the removal or embrittlement of the binder.

Specific examples of the binder include water; organic solvents such as alcohols, ketones, chlorinated hydrocarbons and fluorinated and chlorinated hydrocarbons; saccharides such as glucose, sucrose and starch; water-soluble salts such as sodium carboxycellulose, gum arabic and metal soaps, as well as aqueous solutions thereof.

Examples of inorganic binders include talc, sericite, diatomaceous earth, boron nitride, alumina, titanium oxide, silica, calcium silicate, carbon black, graphite, glass, zinc sulfide, molybdenum disulfide, magnesium oxide, magnesium hydroxide, calcium carbonate, wollastonite, kaolin and bentonite.

The present invention is now described in greater detail by reference to the following examples and comparative examples which are given here for illustrative purposes only and are by no means intended to limit the scope of the invention. Unless otherwise indicated, all percents, parts, ratios and the like are by weight.

EXAMPLES 1 TO 3 AND COMPARATIVE EXAMPLES 1 TO 3

Six kinds of fluorine-containing elastomeric copolymers having different molecular weight as shown in Table 1 below were prepared by heat treating tetrafluoroethylene-propylene copolymers ($C_2F_4/C_3H_6$ molar ratio=55/45, $\overline{Mn}$=130,000) in air under various conditions.

100 parts of each elastomeric copolymer was blended with 1 part of dicumyl peroxide (organic peroxide), 5 parts of triallyl isocyanurate (polyallyl compound), 40 parts of MT carbon (filler) and 1 part of sodium stearate (lubricant), and the mixture was kneaded with an 8-inch roll at 50°-60° C. for 15 minutes.

Each blend was extruded through a 40 mm diameter extruder (L/D=22, head: 100° C., cylinder 1: 100° C., cylinder 2: 80° C.) to form a 1 mm thick insulation coating on a tin-plated copper wire (outer diameter: 1.6 mm), and the coating was cross-linked by exposing it to steam (13 atm, ca. 190° C.) for 3 minutes.

The surface smoothness and strength of the resulting insulated wires are shown in Table 1 below in addition to the number average molecular weight ($\overline{Mn}$) of the fluorine-containing elastomeric copolymers and the Mooney viscosity [$ML_{1+4}$ (100° C.)] of the blends.

TABLE 1

| | Examples | | | Comparative Examples | | |
|---|---|---|---|---|---|---|
| | 1 | 2 | 3 | 1 | 2 | 3 |
| $\overline{Mn}$ (× 10,000) | 3.2 | 3.9 | 4.8 | 1.3 | 7.2 | 1.3* |
| $ML_{1+4}$ (100° C.) | 33 | 64 | 90 | 18 | 155 | 200 |
| Surface smoothness | good | good | good | good | cracks occur | molding impossible |
| Coating strength | high | high | high | poor | high | high |

*No heat treatment

EXAMPLES 4 AND 5

Insulated wires were prepared as in Example 2 from the same blends as in Example 2 except that one no filler (MT carbon) was used (Example 4) and 80 parts of the filler was used (Example 5). The two wires and good surface smoothness and high strength.

EXAMPLE 6

An insulated wire was prepared in the same manner as in Example 1 except that the tetrafluoroethylene-propylene copolymer was replaced by a tetrafluoroethylene/ethylene/isobutylene terpolymer ($C_2F_4/C_2H_4/C_4H_8$ molar ratio=52/24/24, $\overline{Mn}$=43,000). The wire had good surface smoothness and high strength.

COMPARATIVE EXAMPLE 4

An insulated wire was prepared using the following composition in the same manner as in Example 2.

| | parts |
|---|---|
| Vinylidene fluorine/hexafluoropropene copolymer ("Daiel G 801" of Daikin Kogyo Co., Ltd.) | 100 |
| 2,5-Dimethyl-2,5-di(t-butylperoxy)hexane | 1.5 |
| Triallyl isocyanurate | 4.0 |
| MT carbon | 20 |

The wire had good surface smoothness and high strength, but its insulation resistance was as low as 50 MΩ-km. On the other hand, the wire of Example had an insulation resistance of 5,000 MΩ-km.

EXAMPLES 7 TO 16 AND COMPARATIVE EXAMPLES 5 TO 9

Each of mixture consisting of 100 parts of a tetrafluoroethylene/propylene copolymer ($C_2F_4/C_3H_6$ molar ratio=54/46, $\overline{Mn}$=50,000), 1 part of 2,5-dimethyl-2,5-di-(benzoylperoxy)hexane (cross-linking agent), 5 parts of triallyl isocyanurate (cross-linking aid), 1 part of sodium stearate (lubricant) and the additives shown in Table 2 in the amounts also shown in Table 2 was kneaded with a heated roll (50°-60° C.) for 15 minutes to form a uniform dispersion. The blend was then extruded through a 40 mm diameter extruder (L/D=22, head: 80° C., cylinder 1: 80° C., cylinder 2: 60° C.) to form a 0.7 mm thick insulation coating on a copper conductor (outer diameter: 1.6 mm), and the coating was cross-linked by exposing it to steam (13 atm, ca. 190° C.) for 3 minutes.

The dielectric strength of the resulting insulated wires and the mechanical characteristics of the insulation coatings are shown in Table 2 below.

The dielectric strength was evaluated in terms of A.C. breakdown voltage which was measured as follows: Initial voltage that was 50% of the expected value of breakdown voltage was applied to a U-shaped 50 cm long test sample the lower half of which was immersed in water, and the voltage was increased with 1 kv/minute until the sample broken.

The mechanical characteristics of the insulation coatings were evaluated in terms of tensile characteristics which were tested by a method specified in JIS.

TABLE 2

(parts by weight)

| Compo Additives | Examples | | | | | | | | | | Comparative Examples | | | | |
|---|---|---|---|---|---|---|---|---|---|---|---|---|---|---|---|
| | 7 | 8 | 9 | 10 | 11 | 12 | 13 | 14 | 15 | 16 | 5 | 6 | 7 | 8 | 9 |
| Metal oxide | | | | | | | | | | | | | | | |
| Calcium oxide | | | | | | | 1 | 10 | | 1 | | | | | |
| Magnesium oxide | 1 | 1 | 1 | 1 | 1 | 1 | | | | | 1 | 1 | 1 | | 20 |
| Lead oxide | | | | | | | | | 5 | | | | | | |
| Silicic filler | | | | | | | | | | | | | | | |
| Silicic anhydride | 10 | | | | 10 | | | | | 10 | | | | | |
| Aluminum hydroxide | | 20 | 80 | | 30 | | 30 | 30 | 30 | | | | | 30 | 30 |
| Magnesium silicate | | | | 50 | | | | | | | | | | | |
| MT carbon | | | | | 20 | | 20 | 20 | 20 | | | 20 | | 20 | 20 |
| SRF carbon | | | | | | 10 | | | | 10 | | | 20 | | |
| α-Alumina | | | | | | | | | | | 30 | | | | |
| A.C. Breakdown voltage (kv) | | | | | | | | | | | | | | | |
| Initial | 30 | 32 | 31 | 30 | 28 | 29 | 27 | 27 | 28 | 31 | 30 | 25 | 24 | 26 | 28 |
| 250° C. × 4 | 32 | 31 | 30 | 28 | 23 | 25 | 20 | 22 | 25 | 25 | 10 | 3> | 4 | 21 | 22 |
| Tensile strength (kg/mm²) | 1.52 | 1.58 | 1.62 | 1.65 | 1.60 | 1.59 | 1.48 | 1.60 | 1.36 | 1.51 | 1.31 | 1.63 | 1.65 | 0.87 | 1.55 |
| Elongation (%) | 400 | 380 | 310 | 300 | 330 | 360 | 390 | 320 | 430 | 350 | 410 | 400 | 380 | 520 | 180 |

The insulation coatings on the wires of Examples 7 to 16 are the system containing specific silicic compound and metal oxide according to the present invention. The lowering of A.C. breakdown voltage due to thermal aging could not be almost observed, and it is apparent that the insulation coatings had satisfactory tensile strength and elongation.

The insulation coatings on the wires of Comparative Examples 5 to 7 are the system which contains the specified metal oxide of the present invention but contains no silicic compound. They had good tensile strength and elongation, but their A.C. breakdown voltage was greatly reduced due to thermal aging.

The insulation coating on the wire of Comparative Example 8 is the system which contains a silicic compound but does not contain the metal oxide specified in the present invention. The lowering of A.C. breakdown voltage due to thermal aging was small but its tensile strength was as low as 0.87 kg/mm².

The insulation coating on the wire of comparative Example 9 is the system which contains both silicic compound and metal oxide specified in the present invention, but the amount of the metal oxide was greater than the upper limit specified in the present invention. The lowering of A.C. breakdown voltage due to thermal aging was less and the tensile strength was sufficient but its elongation was only 180%.

EXAMPLES 17 TO 28

100 parts of a tetrafluoroethylene-propylene copolymer ($C_2F_4/C_3H_6$ molar ratio=55/45, $\overline{Mn}$=50,000) was blended with 1 part of 1,3-bis(t-butylperoxy-isopropyl)-benzene (cross-linking agent), 5 parts of triallyl isocyanurate (cross-linking agent), 40 parts of thermal carbon (filler), and 1 part of sodium stearate (lubricant). The blend was kneaded with a rubber kneading roll (50°-60° C., diameter=150 mm) to produce a composition having a Mooney viscosity [$ML_{1+4}$ (100° C.)] of 40.

The composition was extruded through a 40 mm diameter extruder (L/D=22, head: 80° C., cylinder 1: 80° C., cylinder 2: 60° C.) to form a coating (0.6 mm thick) on each of the stranded tin-plated copper conductors (outer diameter: 1.6 mm) having intermediate layers of the materials shown in Table 3, and the insulation coatings were cross-linked by being exposed it to steam (13 atm) for 3 minutes.

TABLE 3

| Materials of Intermediate Layer | Thickness (μm) | Symbol |
|---|---|---|
| Polyimide film | 70 | A |
| Polyamideimide film | 50 | B |
| Polysulfone film | 50 | C |
| Polyamide (Nylon 12) film | 50 | D |
| Polyethylene terephthalate film | 50 | E |
| Polyethylene terephthalate nonwoven fabric | 50 | F |
| Polyethylene film | 30 | G |
| Paper | 30 | H |

Each of the insulated wires was wound around a brass rod having the same diameter as each wire at room temperature without thermal aging and then exposed to a temperature of 150° C. or 200° C. for 3 hours. The intermediate layers and insulation coatings were checked for any flaw. The resistance to stripping of the overall coatings was also checked.

The results obtained are shown in Table 4.

The same wires were aged at 150° C. for 10 days (condition I) or at 200° C. for 10 days (condition II) and then were wound around a brass rod having the same diameter as each wire and exposed to a temperature of 150° C. or 200° C.

The results obtained were the same as those obtained when the wires were not thermally aged before winding around the brass rod.

TABLE 4

| | Material of Intermediate Layer | Results of Winding under Heating Test | | |
|---|---|---|---|---|
| | | Temperature (°C.) | Intermediate Layer | Insulation Coating | Resistance to Stripping |
| Ex. 17 | A | 200 | Good | No crack | Good |
| Ex. 18 | B | 200 | Good | No crack | Good |
| Ex. 19 | C | 200 | Good | No crack | Good |
| Ex. 20 | D | 150 | Good | No crack | Good |
| Ex. 21 | E | 150 | Good | No crack | Good |
| Ex. 22 | F | 150 | Good | No crack | Good |

TABLE 5

| | Material of Intermediate Layer | Aging Condition | Results of Winding under Heating Test | | | |
|---|---|---|---|---|---|---|
| | | | Temperature (°C.) | Intermediate Layer | Insulation Coating | Resistance to Stripping |
| Ex. 23 | A | II | 200 | Good | No crack | Good |
| Ex. 24 | B | II | 200 | Good | No crack | Good |
| Ex. 25 | C | II | 200 | Good | No crack | Good |
| Ex. 26 | D | I | 150 | Good | No crack | Good |
| Ex. 27 | E | I | 150 | Good | No crack | Good |
| Ex. 28 | F | I | 150 | Good | No crack | Good |

EXAMPLES 29 TO 36

Insulated wires were prepared in the same manners as in Examples 17 to 28 except that the intermediate layers were made of the materials shown in Table 6.

Each of the wires was wound around a brass rod having the same diameter as each wire at room temperature without thermal aging and then exposed to a temperature of 150° C. or 200° C. for 3 hours to check for any crack occurring in the insulation coatings. The intermediate layers used in Examples 29 to 31 were made of paper treated with silicone releasing agents; the intermediate layer used in Example 32 was made of paper treated with an oil-resistant fluorine agent ("AG 530" of Asahi Glass Co., Ltd.); and the intermediate layers used in Examples 33 to 36 were made of fluorine resin films. No crack occurred at either 150° C. or 200° C.

TABLE 6

| Sample No. | Intermediate Layer | |
|---|---|---|
| | Material | Thickness (μm) |
| Ex. 29 | Silicone oil impregnated paper | 30 |
| Ex. 30 | Silicone grease coated paper | 30 |
| Ex. 31 | Silicone varnish coated paper | 30 |
| Ex. 32 | Paper treated with fluorine oil-resistant agent | 30 |
| Ex. 33 | Ethylene-tetrafluoroethylene copolymer film | 30 |
| Ex. 34 | Polyvinyl fluoride film | 30 |
| Ex. 35 | Tetrafluoroethylene-hexafluoropropene copolymer film | 51 |
| Ex. 36 | Unsintered polytetrafluoroethylene tape | 25 |

EXAMPLE 37

An insulated wire was prepared in the same manner as in Example 31 except that the composition comprising a fluorine-containing elastomer as the major component was replaced by the following composition [Mooney viscosity $ML_{1+4}$ (100° C.)=80].

| | parts |
|---|---|
| Vinylidene fluoride-hexafluoropropene copolymer ("DAIEL G 801" of Daikin Kogyo Co., Ltd.) | 100 |
| Thermal carbon | 20 |
| 2,5-Dimethyl-2,5-di(t-butylperoxy)-hexane | 1.5 |
| Triallyl isocyanurate | 4.0 |

The wire was subjected to the same winding under heating test as in Example 31 but no crack occurred in the insulation coating at either 150° C. or 200° C.

EXAMPLES 38 TO 40

Insulated wires were prepared in the same manners as in Examples 17 to 28 except that the intermediate layer was made of a 30 μm thick paper sheet. The wires were aged under the conditions shown in Table 7, wound around a brass rod having the same diameter as that of the wires at room temperature and then exposed to 150° C. or 250° C. for 3 hours. No crack occurred in the insulation coatings at either 150° C. or 250° C.

TABLE 7

| Sample No. | Aging Conditions (temp. × time) |
|---|---|
| Ex. 38 | 300° C. × 10 min |
| Ex. 39 | 300° C. × 20 min |
| Ex. 40 | 350° C. × 2 min |

EXAMPLE 41

Insulated wires were prepared in the same manners as in Examples 38 to 40 except that the composition comprising a fluorine-containing elastomer as the major component was replaced by the composition used in Example 37. The wires were heat-treated as in Example 38 and then subjected to a winding test under heating. No crack occurred in the insulating coatings either at 150° C. or at 250° C.

EXAMPLE 42

An insulated wire was prepared in the same manners as in Examples 38 to 40 except that the intermediate layer around the conductor was mainly made of α-alumina and had a dry thickness of about 40 μm. The wire was subjected to the same winding test under heating as in Examples 38 to 40. No crack occurred in the insulation coating at either 150° C. or 250° C.

The intermediate layer was prepared in the following manner:

100 parts of α-alumina ("White Morundum #3000", a product of Fujimi Kenmazai Kogyo Co., Ltd., average particle size=5 μm) was blended with 100 parts of water and 4 parts of commercial flour, and the blend was kneaded under heating to provide a viscous dispersion. The conductor was immersed in the dispersion and a uniform coating was formed on the conductor with a brush, and the coating was dried by exposure to an infrared lamp.

EXAMPLE 43

An insulated wire was prepared in the same manners as in Example 42 except that the α-alumina was replaced by talc ("LM-R", a product of Tsuchiya Kaolin Kogyo Co., Ltd.). The same results were obtained as in Example 42.

What is claimed is:

1. A fluorine-containing elastomer insulated conductor comprising:
   (1) a conductor composed of a plurality of wires, (2) a layer of a vulcanized insulation coating surrounding said conductor, said layer of a vulcanized insulating coating comprising 100 parts by weight of a fluorine-containing elastomeric copolymer having a number average molecular weight of from 20,000 to 60,000, containing as major components a unit based on tetrafluoroethylene and a unit based on an α-olefin having 2 to 4 carbon atoms and exhibiting rubber elasticity at room temperature, 0.1 to 5 parts by weight of an organic peroxide, 0.1 to 20 parts by weight of a polyallyl compound, 0.1 to 15 parts by weight of a metal oxide and 1 to 100 parts by weight of a silicic compound, and (3) an intermediate layer formed between the stranded conductor and the insulation coating which prevents the insulation coating from sinking in spaces between said wires.

2. An insulated electric wire of claim 1, wherein the metal oxide is selected from the group consisting of magnesium oxide, calcium oxide and lead oxide.

3. An insulated electric wire of claim 1, wherein the fluorine-containing elastomeric copolymer has a number average molecular weight of from 30,000 to 50,000.

4. An insulated electric wire of claim 1, wherein the fluorine-containing elastomeric copolymer is a tetrafluoroethylene-propylene copolymer.

5. An insulated electric wire of claim 4, wherein the molar ratio of tetrafluoroethylene to propylene is from 95:5 to 30:70.

6. An insulated electric wire of claim 1, wherein the amount of the organic peroxide is from 0.5 to 3 parts by weight.

7. An insulated electric wire of claim 1, wherein the amount of the polyallyl compound is from 0.2 to 10 parts by weight.

8. An insulated electric wire according to claim 1, wherein said layer of a vulcanized insulation coating has a Mooney viscosity $ML_{1+4}$ (100° C.) of from 20 to 150.

9. An insulated electric wire of claim 1, wherein the intermediate layer does not break and remains solid when the electric wire is subjected to a winding test at 150° C. or higher.

10. An insulated electric wire of claim 1, wherein the surface of the intermediate layer contacting the insulation coating is non-sticky.

11. An insulated electric wire of claim 10, wherein the surface of the intermediate layer contacting the insulation coating is easily disintegrable.

12. An insulated electric wire of claim 1, wherein said α-olefin having 2 to 4 carbon atoms is propylene.

* * * * *